(12) United States Patent
Yokoi et al.

(10) Patent No.: US 7,836,685 B2
(45) Date of Patent: Nov. 23, 2010

(54) REGENERATION CONTROLLER FOR EXHAUST PURIFICATION APPARATUS OF INTERNAL COMBUSTION ENGINE

(75) Inventors: Tatsuhisa Yokoi, Toyota (JP); Yukihisa Yamamoto, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 1326 days.

(21) Appl. No.: 10/567,348

(22) PCT Filed: Mar. 10, 2005

(86) PCT No.: PCT/JP2005/004735

§ 371 (c)(1),
(2), (4) Date: Feb. 6, 2006

(87) PCT Pub. No.: WO2005/088108

PCT Pub. Date: Sep. 22, 2005

(65) Prior Publication Data

US 2007/0051098 A1    Mar. 8, 2007

(30) Foreign Application Priority Data

Mar. 11, 2004    (JP) .............................. 2004-068997

(51) Int. Cl.
*F01N 3/00* (2006.01)
(52) U.S. Cl. .............................. 60/295; 60/274; 60/285; 60/297; 60/311
(58) Field of Classification Search .................. 60/274, 60/285, 295, 297, 311
See application file for complete search history.

(56) References Cited

U.S. PATENT DOCUMENTS 4,509,327 A    4/1985 Enga (Continued)

FOREIGN PATENT DOCUMENTS

| JP | 2002-227688 | 8/2002 |
|---|---|---|
| JP | 2003-020930 | 1/2003 |
| JP | 2004-183525 A | 7/2004 |

* cited by examiner

*Primary Examiner*—Thomas E Denion
*Assistant Examiner*—Diem Tran
(74) *Attorney, Agent, or Firm*—Kenyon & Kenyon LLP

(57) ABSTRACT

A regeneration controller for preventing particulate matter from increasing when an exhaust purification apparatus is inactivated. The regeneration controller includes an ECU 70 for heating the exhaust purification apparatus and eliminating the particulate matter accumulated in the exhaust purification apparatus when an estimated accumulation amount is greater than a reference accumulation amount. The ECU 70 obtains the estimated accumulation amount by estimating the amount of particulate matter accumulated in the exhaust purification apparatus. An exhaust temperature sensor 44 detects the temperature of the exhaust purification apparatus. The ECU 70 intermittently decreases the air-fuel ratio of exhaust to heat the exhaust purification apparatus and perform burn-up heating for burning the particulate matter. The ECU 70 further prohibits burn-up heating when the temperature detected by an exhaust temperature sensor 44 decreases to a catalyst inactivation level.

14 Claims, 10 Drawing Sheets

U.S. PATENT DOCUMENTS

| | | | |
|---|---|---|---|
| 6,644,020 B2 * | 11/2003 | Kuenstler et al. | 60/286 |
| 6,708,487 B2 * | 3/2004 | Morimoto et al. | 60/311 |
| 6,763,659 B2 * | 7/2004 | Watanabe et al. | 60/297 |
| 6,952,918 B2 * | 10/2005 | Imai et al. | 60/295 |
| 7,055,309 B2 * | 6/2006 | Plote et al. | 60/277 |
| 2004/0040292 A1 | 3/2004 | Odendall | |
| 2004/0074225 A1 | 4/2004 | Schaller et al. | |
| 2004/0187477 A1 | 9/2004 | Okugawa et al. | |

REGENERATION CONTROLLER FOR EXHAUST PURIFICATION APPARATUS OF INTERNAL COMBUSTION ENGINE

RELATED APPLICATIONS

This is a 371 application of PCT/JP2005/004735 filed on 10 Mar. 2005, claiming priority to Japanese Application No. 2004-068997 filed on 11 Mar. 2004, the entire contents of which are incorporated herein by reference.

TECHNICAL FIELD

The present invention relates to a regeneration controller that eliminates particulate matter accumulated in an exhaust purification apparatus of an internal combustion engine.

BACKGROUND ART

Japanese Laid-Open Patent Publication Nos. 2002-227688 and 2003-20930 describes a technique that is used when particulate matter (PM) accumulates in a filter, which is arranged in an exhaust system of a diesel engine. The particulate matter is burned and eliminated from the filter.

More specifically, the air-fuel ratio of the exhaust is repeatedly adjusted between a rich state and a lean state so that the temperature of the exhaust purification apparatus becomes higher than during normal purification. In addition, when the air-fuel ratio of the exhaust is in a lean state, active oxygen is released from the catalyst of the exhaust purification apparatus. This burns up the particulate matter accumulated in the filter.

In this burn-up process, a large amount of fuel is released into the exhaust within a short period of time when the air-fuel ratio of the exhaust is in a rich state. Accordingly, the burn-up process must be prohibited when the engine is operating in a state in which the temperature of the exhaust is low. A map may be used to determine whether the temperature of the exhaust is low when the engine is operating normally. However, when the engine is in an operation transition state, there may be a case in which the exhaust temperature is determined as not being low in accordance with the map even if the actual temperature of the exhaust purification apparatus is low and the catalyst may be inactivated.

In such a case, when a large amount of fuel is released into the exhaust within a short period of time, fuel is not sufficiently burned (oxidized) in the exhaust purification apparatus. As a result, incomplete combustion of the fuel may produce a large amount of particulate matter that further accumulates in the filter.

SUMMARY OF THE INVENTION

It is an object of the present invention to prevent particulate matter from being increased when an exhaust purification apparatus is inactivated.

One aspect of the present invention is a regeneration controller for eliminating particulate matter accumulated in an exhaust purification apparatus in an exhaust system of an internal combustion engine, in which exhaust having an air-fuel ratio passes through the exhaust system during engine operation. The exhaust purification apparatus includes a catalyst. The regeneration controller includes a heating section for heating the exhaust purification apparatus and eliminating the particulate matter accumulated in the exhaust purification apparatus when an estimated accumulation amount is greater than a reference accumulation amount. The heating section obtains the estimated accumulation amount by estimating the amount of particulate matter accumulated in the exhaust purification apparatus. A temperature detector detects temperature of the exhaust purification apparatus. A control section intermittently decreases the air-fuel ratio of the exhaust to heat the exhaust purification apparatus and perform burn-up heating for burning the particulate matter. A prohibition section prohibits burn-up heating when the temperature detected by the temperature detector decreases to a catalyst inactivation level.

Another aspect of the present invention is a regeneration controller for eliminating particulate matter accumulated in an exhaust purification apparatus in an exhaust system of an internal combustion engine, in which exhaust having an air-fuel ratio passes through the exhaust system during engine operation. The exhaust purification apparatus includes a catalyst. The regeneration controller includes a heating section for heating the exhaust purification apparatus and eliminating the particulate matter accumulated in the exhaust purification apparatus when an estimated accumulation amount is greater than a reference accumulation amount. The heating section obtains the estimated accumulation amount by estimating the amount of particulate matter accumulated in the exhaust purification apparatus. A temperature detector detects temperature of the exhaust purification apparatus. A control section intermittently decreases the air-fuel ratio of the exhaust to heat the exhaust purification apparatus and perform burn-up heating for burning the particulate matter. A prohibition section prohibits burn-up heating when the period during which the temperature detected by the temperature detector is lower than a catalyst inactivation level is longer than a prohibition determination reference period.

A further aspect of the present invention is a method for eliminating particulate matter accumulated in an exhaust purification apparatus in an exhaust system of an internal combustion engine, in which exhaust having an air-fuel ratio passes through the exhaust system during engine operation. The method includes heating the exhaust purification apparatus by intermittently decreasing the air-fuel ratio of the exhaust to perform burn-up heating for burning the particulate matter, detecting temperature of the exhaust purification apparatus, and prohibiting burn-up heating based on the detected temperature.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

BEST MODE FOR CARRYING OUT THE INVENTION

Figure 1:
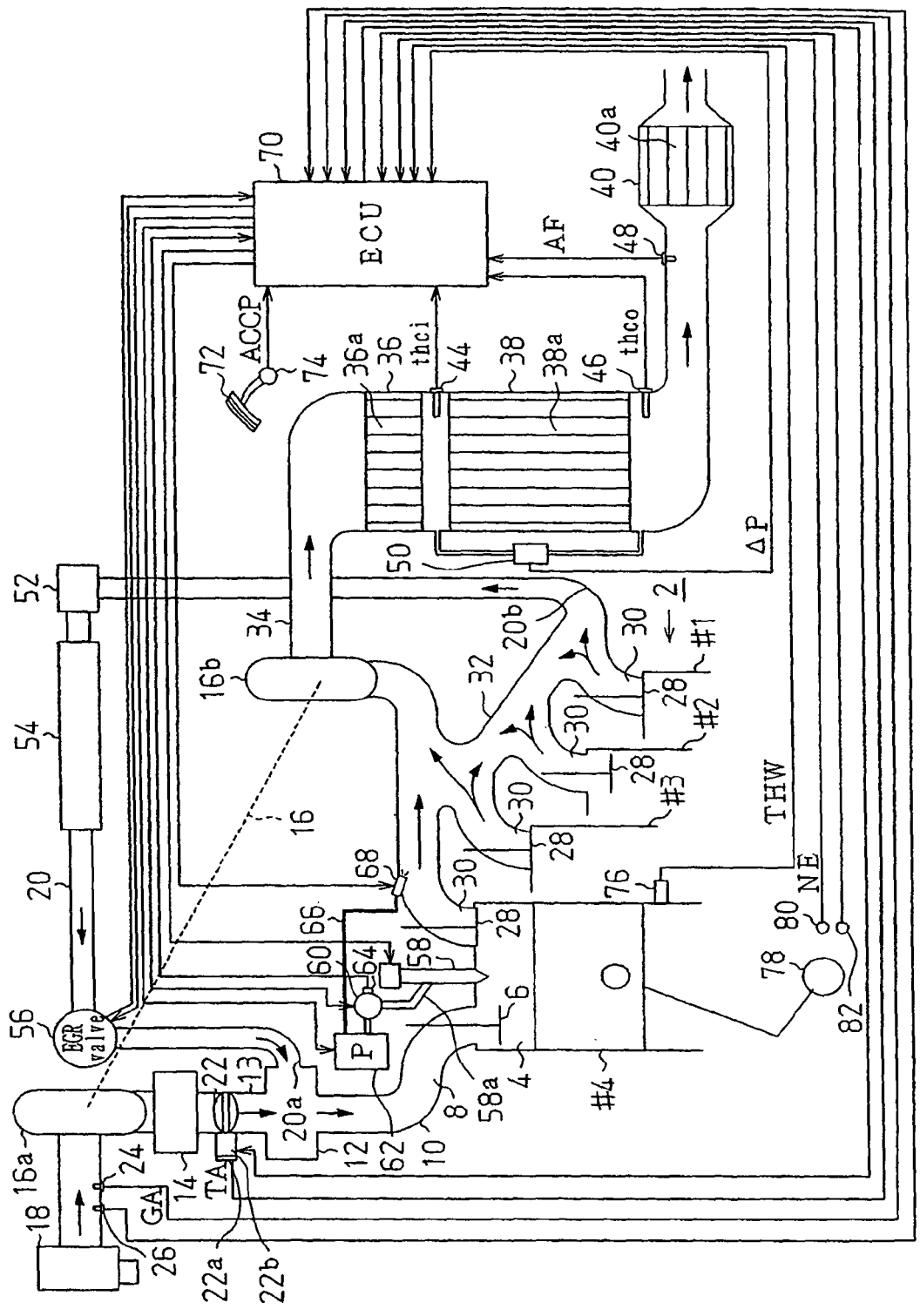
FIG. 1 is a schematic diagram showing a control system of a vehicle diesel engine according to a first embodiment of the present invention.

A regeneration controller for an exhaust purification apparatus of an internal combustion engine according to a first embodiment of the present invention will now be discussed. FIG. 1 is a schematic diagram of a control system including the regeneration controller, which is applied to a vehicle diesel engine. The application of the regeneration controller of the present invention is not limited to a diesel engine. That is, the regeneration controller of the present invention is also applicable to a lean-burn gasoline engine.

A diesel engine 2 includes a plurality of cylinders including first to fourth cylinders #1, #2, #3, and #4. In each of the cylinders #1 to #4, a combustion chamber 4 is connected to a surge tank 12 via an intake port 8 and an intake manifold 10. Each intake port 8 is opened and closed by an intake valve 6. The surge tank 12 is connected to an intercooler 14 and a supercharger such as an exhaust turbocharger 16. Fresh air supplied via an air cleaner 18 is compressed by a compressor 16a of the exhaust turbocharger 16. The surge tank 12 has an EGR gas supply port 20a of an exhaust gas recirculation (EGR) passage 20. A throttle valve 22 is arranged in an intake passage 13 between the surge tank 12 and the intercooler 14. An intake air amount sensor 24 and an intake air temperature sensor 26 are arranged between the compressor 16a and the air cleaner 18.

In each of the cylinders #1 to #4, the combustion chamber 4 is connected to an exhaust port 30 and an exhaust manifold 32. Each exhaust port 30 is opened and closed by an exhaust valve 28. An exhaust turbine 16b of the exhaust turbocharger 16 is arranged between the exhaust manifold 32 and the exhaust passage 34. The exhaust is sent into the exhaust turbine 16b from a position in the exhaust manifold 32 close to the fourth cylinder #4.

Three exhaust purification mechanisms, each accommodating an exhaust purification catalyst, namely, catalytic converters 36, 38, and 40, are arranged in the exhaust passage 34. The first catalytic converter 36, which is positioned the furthest upstream, accommodates a NOx storage reduction catalyst 36a. When the exhaust of the diesel engine 2, which is operating normally, is in an oxidation atmosphere (lean), NOx is stored in the NOx storage reduction catalyst 36a. When the exhaust is in a reduction atmosphere (stoichiometric or air-fuel ratio being lower than that the stoichiometric condition), the NOx stored in the NOx storage reduction catalyst 36a is reduced to NO, separated from the NOx storage reduction catalyst 36a, and further reduced using HC and CO. In this way, NOx is eliminated.

The second catalytic converter 38, which is arranged downstream from the first catalytic converter 36, accommodates a filter 38a having a monolithic structure. Walls of the filter 38a have pores that permit the passage of exhaust. The porous wall surface of the filter 38a is coated with a layer of a NOx storage reduction catalyst. The filter 38a functions as a base for the NOx storage reduction catalyst layer. The NOx storage reduction catalyst layer eliminates NOx in the same manner as the NOx storage reduction catalyst 36a. Particulate matter (PM) contained in the exhaust is accumulated in the wall of the filter 38a. The PM is first oxidized by active oxygen released when NOx is exposed in an oxidation atmosphere under a relatively high temperature. Then, the PM is entirely oxidized by the surrounding excess oxygen. In this way, not only NOx but also PM is eliminated from the filter 38a. The first catalytic converter 36 is formed integrally with the second catalytic converter 38.

The third catalytic converter 40, which is positioned the farthest downstream, accommodates an oxidation catalyst 40a for eliminating HC and CO through oxidation. A first exhaust temperature sensor 44 is arranged between the NOx storage reduction catalyst 36a and the filter 38a. Between the filter 38a and the oxidation catalyst 40a, a second exhaust temperature sensor 46 is arranged near the filter 38a, and an air-fuel ratio sensor 48 is arranged near the oxidation catalyst 40a.

The air-fuel ratio sensor 48 is, for example, a sensor using a solid electrolyte. The air-fuel ratio sensor 48 detects the air-fuel ratio of the exhaust based on exhaust components and generates a voltage signal, which is linearly proportional to the air-fuel ratio. The first exhaust temperature sensor 44 and the second exhaust temperature sensor 46 respectively detect exhaust temperatures thci and thco at their respective locations.

A pressure difference sensor 50 is connected to a pipe connecting the upstream side and downstream side of the filter 38a. The pressure difference sensor 50 detects the pressure difference $\Delta P$ between the upstream and downstream sides of the filter 38a to detect the clogging degree of the filter 38a, that is, the degree of accumulation of PM in the filter 38a.

The exhaust manifold 32 has an EGR gas inlet 20b of the EGR passage 20 located near the first cylinder #1, or distant from the fourth cylinder #4 that sends exhaust into the exhaust turbine 16b.

A steel EGR catalyst 52 for reforming the EGR gas, a cooler 54 for cooling the EGR gas, and an EGR valve 56 are arranged in the EGR passage 20 in this order from the EGR gas inlet 20b. The EGR catalyst 52 also functions to prevent clogging of the cooler 54. The amount of EGR gas that is to be supplied again to the intake system via the EGR gas supply port 20a is adjusted according to the opening degree of the EGR valve 56.

A fuel injection valve 58 is arranged in each of the cylinders #1 to #4 and directly injects fuel into the corresponding combustion chamber 4. Each fuel injection valve 58 is connected to a common rail 60 via a fuel supply pipe 58a. A variable discharge amount fuel pump 62, which is electrically controlled, supplies high-pressure fuel into the common rail 60. The high-pressure fuel in the common rail 60 is distributed to the corresponding fuel injection valve 58 via each fuel supply pipe 58a. A fuel pressure sensor 64 detects the pressure of fuel in the common rail 60.

The fuel pump 62 supplies low-pressure fuel to a fuel adding valve 68 via a fuel supply pipe 66. The fuel adding valve 68 is arranged in an exhaust port 30 of the fourth cylinder #4 to inject fuel toward the exhaust turbine 16b. The fuel adding valve 68 adds fuel to the exhaust in a catalyst control mode.

An electronic control unit (ECU) 70 includes a digital computer system including a CPU, a ROM, a RAM, and drive circuits. The drive circuit drives various units. The ECU 70 is provided with detection signals from the intake air amount sensor 24, the intake air temperature sensor 26, the first exhaust temperature sensor 44, the second exhaust temperature sensor 46, the air-fuel ratio sensor 48, the pressure difference sensor 50, an EGR opening degree sensor included in the EGR valve 56, a fuel pressure sensor 64, a throttle opening degree sensor 22*a*, an accelerator opening degree sensor 74, a coolant temperature sensor 76, an engine speed sensor 80, and a cylinder distinction sensor 82. The accelerator opening degree sensor 74 detects the depressed amount of an accelerator pedal 72 (accelerator opening degree ACCP). The coolant temperature sensor 76 detects the coolant temperature THW of the diesel engine 2. The engine speed sensor 80 detects the engine speed NE, or rotation speed of the crankshaft 78. The cylinder distinction sensor 82 detects the rotational phase of the crankshaft 78 or the rotational phase of an intake cam to distinguish cylinders.

The ECU 70 determines the driving state of the engine from these detection signals to control fuel injection (amount and timing) of the fuel injection valves 58 according to the driving state of the engine. The ECU 70 executes control for adjusting the opening degree of the EGR valve 56, adjusting the throttle opening degree with a motor 22*b*, and adjusting the discharge amount of the fuel pump 62. Further, the ECU 70 executes catalyst control including a regeneration mode, a sulfur components decomposition-release mode (hereinafter referred to as a sulfur elimination mode), a NOx reduction mode, and a normal control mode. The catalyst control will be described later.

The ECU 70 executes a combustion mode selected from two combustion modes, namely, a normal combustion mode and a low temperature combustion mode, according to the driving state of the engine. In the low temperature combustion mode, the ECU 70 simultaneously reduces NOx and smoke by slowing the increase of the combustion temperature by using a large recirculation amount of exhaust based on an EGR valve opening degree map for the low temperature combustion mode. The low temperature combustion mode is executed when the engine is in a range in which the engine load is low and the engine speed is low or intermediate. In the low temperature combustion mode, the ECU 70 executes air-fuel ratio feedback control including adjustment of a throttle opening degree TA based on the air-fuel ratio AF detected by the air-fuel ratio sensor 48. A combustion mode other than the low temperature combustion mode is the normal combustion mode. In the normal combustion mode, the ECU 70 executes normal EGR control (including control that involves no recirculation of the exhaust) based on an EGR valve opening degree map for the normal combustion mode.

The catalyst control will now be described.

In the regeneration mode, the ECU 70 particularly heats PM accumulated in the filter 38*a* of the second catalytic converter 38 when the estimated accumulation amount of PM in the exhaust purification catalyst reaches a reference accumulation amount. The PM is heated to be oxidized and decomposed to generate $CO_2$ and $H_2O$ and is released as $CO_2$ and $H_2O$ (PM elimination heating). In the regeneration mode, the ECU 70 repeatedly adds fuel with the fuel adding valve 68 to heat the catalyst bed to a high temperature (e.g., 600 to 700° C.) in a state in which the air-fuel ratio is higher than the stoichiometric air-fuel ratio. The ECU 70 may further perform fuel injection (after injection) in each combustion chamber 4 with the corresponding fuel injection valve 58 during the power stroke or the exhaust stroke. The ECU 70 further executes burn-up heating by executing an intermittent fuel adding process. In the intermittent fuel adding process, the ECU 70 intermittently adds fuel with the fuel adding valve 68. A period in which the air-fuel ratio becomes equal to or slightly lower than the stoichiometric air-fuel ratio (enriched state) and a period in which no fuel is added are alternatively repeated. In certain cases, after injection with the fuel injection valves 58 may be performed in combination with the intermittent fuel adding process. The regeneration mode functions to completely burn (burn-up) the PM. Thus, the PM clogging at the front surface of the NOx storage reduction catalyst 36*a* is eliminated, and the PM accumulated in the filter 38*a* is completely burned.

The sulfur elimination mode is executed when the NOx storage reduction catalyst 36*a* and the filter 38*a* are poisoned by sulfur components and their exhaust purification capacity such as NOx storage capacity is lowered. The sulfur elimination mode decomposes and releases sulfur components from the NOx storage reduction catalyst 36*a* and the filter 38*a* so that the NOx storage reduction catalyst 36*a* and the filter 38*a* are rid of sulfur components and restored from sulfur poisoning. In the sulfur elimination mode, the ECU 70 heats the catalyst bed (e.g., to 650° C.) by repeatedly adding fuel from the fuel adding valve 68. The ECU 70 further lowers the air-fuel ratio to be the same as or slightly lower than the stoichiometric air-fuel ratio by intermittently adding fuel from the fuel adding valve 68. In the sulfur elimination mode, the after injection using the fuel injection valve 58 may also be executed.

In the NOx reduction mode, NOx occluded in the NOx storage reduction catalyst 36*a* and the filter 38*a* is reduced to $N_2$, $CO_2$, and $H_2O$, and is released as $N_2$, $CO_2$, and $H_2O$. In the NOx reduction mode, the ECU 70 intermittently adds fuel from the fuel adding valve 68 at relatively long time intervals so that the temperature of the catalyst bed is set relatively low (e.g., 250 to 500° C.). At such a relatively low catalyst bed temperature, the air-fuel ratio is lowered to be the same as or slightly lower than the stoichiometric air-fuel ratio.

The catalyst control excluding the three catalyst control modes described above is the normal control mode. In the normal control mode, the ECU 70 does not perform the fuel addition with the fuel adding valve 68 and the after injection with the fuel injection valve 58.

Figure 2:
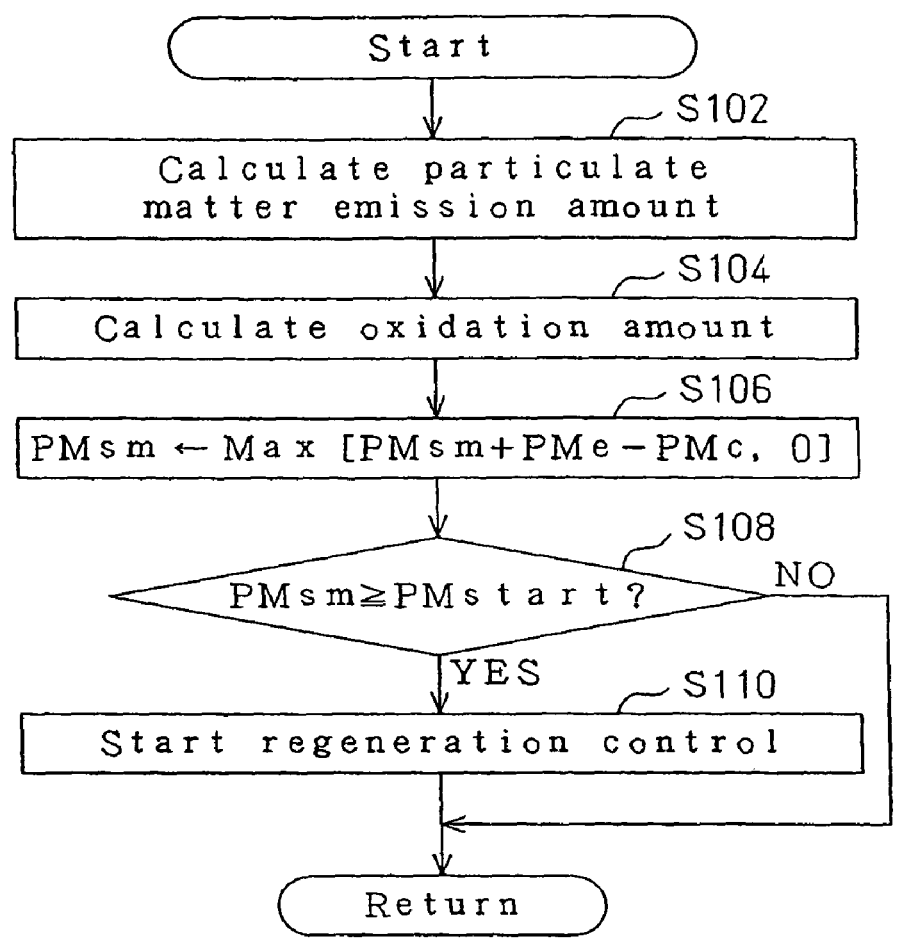
FIG. 2 is a flowchart of regeneration mode execution determination executed by an ECU shown in FIG. 1.
Figure 3:
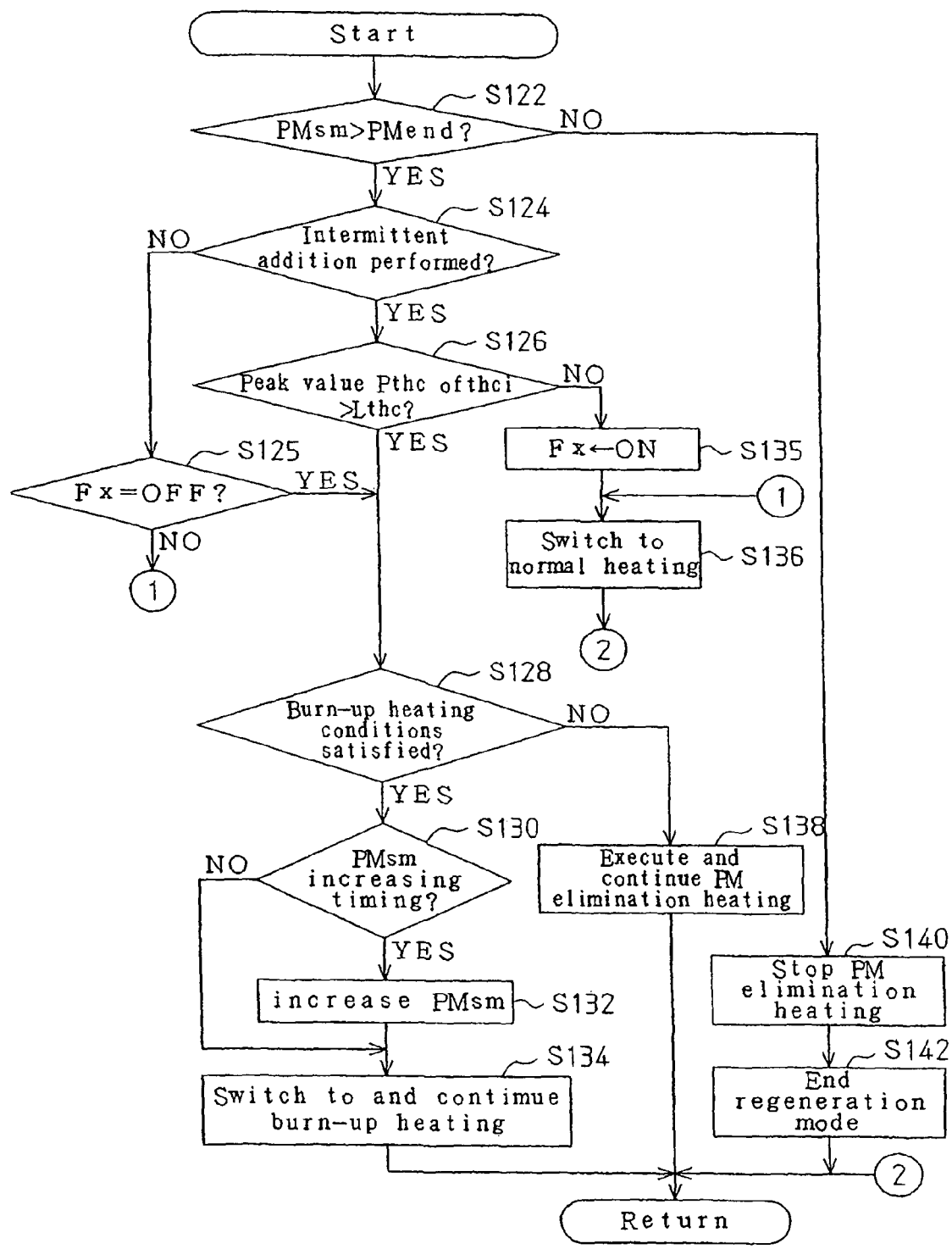
FIG. 3 is a flowchart of regeneration control executed by the ECU shown in FIG. 1.
Figure 4:
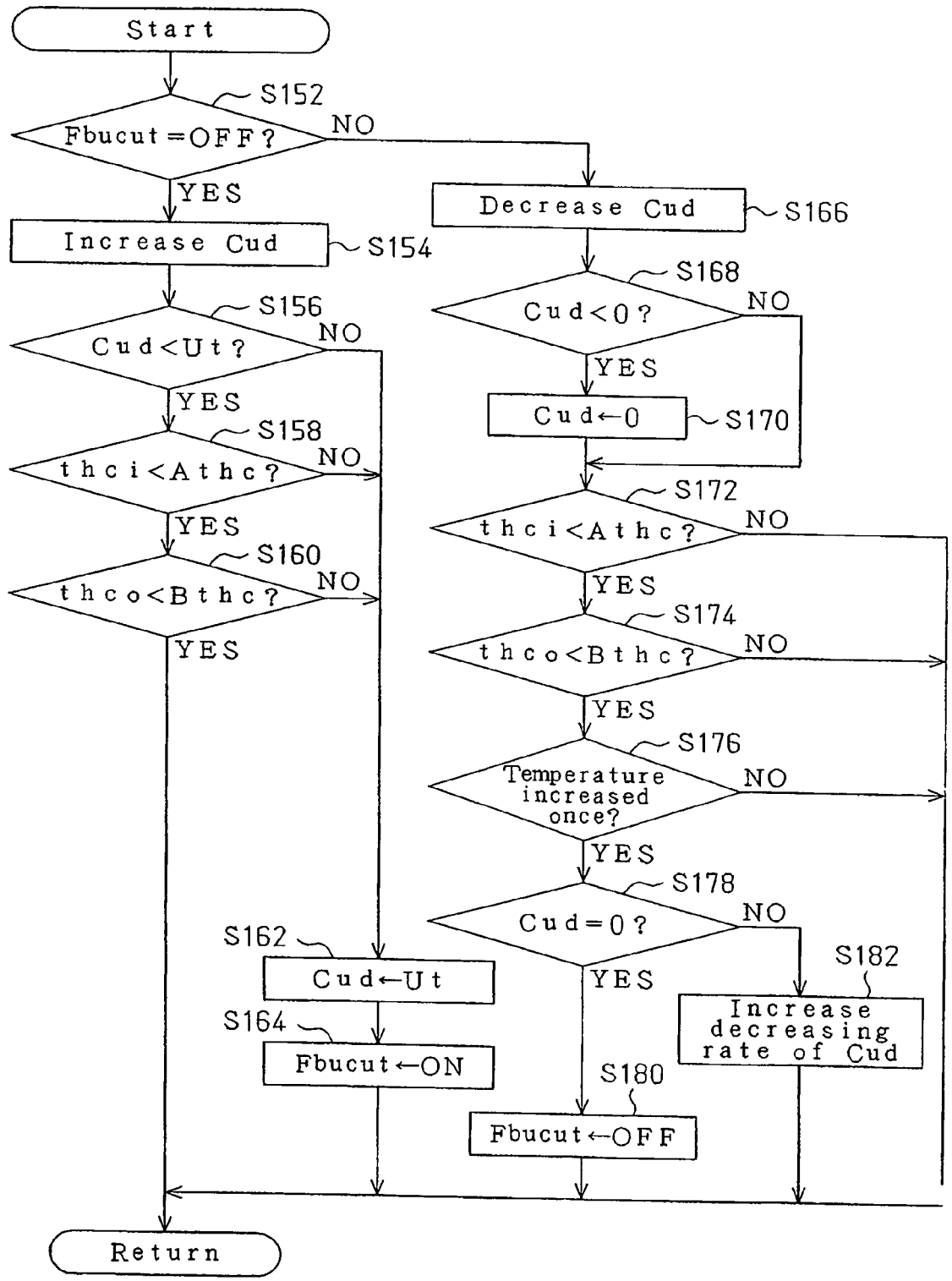
FIG. 4 is a flowchart of burn-up heating executed by the ECU shown in FIG. 1.

The processing executed by the ECU 70 in the regeneration mode will now be discussed. The flowchart of FIG. 2 showing the regeneration mode execution determination, the flowchart of FIG. 3 showing the regeneration control, and the flow chart of FIG. 4 showing burn-up heating are each executed as interrupts in predetermined time cycles. The result of the regeneration mode execution determination in FIG. 2 determines whether to start the regeneration control in FIG. 3. The result of the regeneration control in FIG. 3 determines whether to start the burn-up heating in FIG. 4.

The regeneration mode execution determination (FIG. 2) will first be described. In step S102, the ECU 70 calculates the particulate matter emission amount PMe, which is the total amount of PM emitted from each combustion chamber 4 of the diesel engine 2 during one control cycle in FIG. 2. In this embodiment, the ECU 70 calculates the particulate matter emission amount PMe by referring to a map, which is generated in advance through experiments. The map associates the emission amount with, for example, the engine speed NE and with the engine load (e.g., the fuel injection amount of the fuel injection valve 58). The ECU 70 calculates the particulate matter emission amount PMe from the engine speed NE and the engine load.

In step S104, the ECU 70 calculates the oxidation amount PMc of PM that is accumulated or trapped in the filter 38*a*. The oxidation amount PMc is the amount of the trapped PM that is eliminated through oxidation during one control cycle of this process. In this embodiment, the ECU 70 calculates the oxidation amount PMc by referring to a map, which is generated in advance through experiments. The map associates the oxidation amount with the catalyst bed temperature of the filter 38*a* (e.g., the exhaust temperature thco detected by the second exhaust temperature sensor 46) and with an intake air amount GA. The ECU 70 calculates the oxidation amount PMc from the exhaust temperature thco and the intake air amount GA.

In step S106, the ECU 70 calculates an estimated PM accumulation amount PMsm using expression 1.

$$\text{PMsm} \leftarrow \text{Max}[\text{PMsm}+\text{PMe}-\text{PMc}, 0] \quad (1)$$

In expression 1, the estimated accumulation amount PMsm on the right side is the value calculated in the previous cycle of this process. Max represents an operator for extracting the maximum value of the values in the parentheses. For example, when PMsm+PMe−PMc is a positive value, the resulting value of PMsm+PMe−PMc is set as the estimated accumulation amount PMsm at the left side of the expression. When PMsm+PMe−PMc is a negative value, zero (grams) is set as the estimated accumulation amount PMsm at the left side of the expression.

In step S108, the ECU 70 checks whether the estimated accumulation amount PMsm is greater than or equal to a regeneration reference value PMstart and determines whether to start the regeneration mode. When the estimated accumulation amount PMsm is less than the regeneration reference value PMstart (NO in step S108), the ECU 70 temporarily terminates this process. The state in which the estimated accumulation amount PMsm is less than the regeneration reference value PMstart corresponds to a state before time t0 shown in the timing chart of FIG. 4.

When the state in which the particulate matter emission amount PMe is greater than The oxidation amount PMc continues due to the driving state of the diesel engine 2, steps S102, S104, and S106 are repeated. This gradually increases the estimated accumulation amount PMsm. However, as long as the estimated accumulation amount PMsm is less than the regeneration reference value PMstart (NO in step S108), the ECU 70 temporarily terminates this process.

Figure 5:
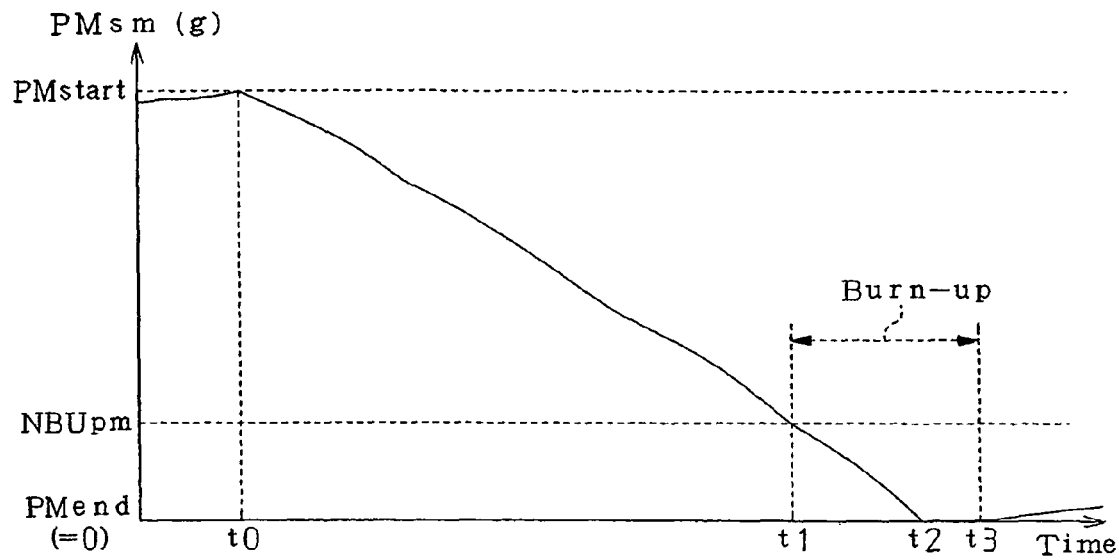
FIGS. 5 to 8 are timing charts for the regeneration control in the first embodiment.

When the estimated accumulation amount PMsm increases and satisfies PMsm≧PMstart (YES in step S108), in step S110, the ECU 70 starts the regeneration control (t0 in FIG. 5). In this case, the regeneration control of FIG. 3 is performed cyclically.

The regeneration control will now be described with reference to FIG. 3. The ECU 70 executes the regeneration control after executing the regeneration mode execution determination in FIG. 2. Thus, the regeneration control is executed in the same cycle as the regeneration mode execution determination.

In step S122, the ECU 70 determines whether or not the estimated accumulation amount PMsm is greater than a termination determination value PMend (e.g., 0 grams). If The estimated accumulation amount PMsm is greater than The termination determination value PMend (YES in S122), in step S124, the ECU 70 determines whether or not fuel is presently being intermittently added in burn-up heating (intermittent addition). Intermittent addition is first not performed (NO in S124). Thus, in step S125, the ECU 70 determines whether or not a burn-up prohibition flag Fx is OFF. The burn-up prohibition flag is set to OFF when the regeneration control is started in step S110 of the regeneration mode execution determination process.

In other words, at this point of time, the burn-up prohibition flag Fx is OFF in step S125 (YES in S125). Then, in step S128, the ECU 70 determines whether the conditions for executing burn-up heating are satisfied.

The ECU 70 performs the burn-up heating when any one of conditions (1) and (2) is satisfied.

(1) The estimated accumulation amount PMsm is less than or equal to a normal burn-up start determination value NBUpm (FIG. 5, PMsm≦NBUpm), which is slightly greater than the termination determination value PMend (e.g., 0 grams).

(2) The ratio ΔP/GA is greater than or equal to a reference value, which indicates PM clogging, and the estimated accumulation amount PMsm is less than or equal to the special burn-up start determination value SBUpm (PMsm≦NBUpm), which is slightly greater than the termination determination value PMend. The special burn-up start determination value SBUpm is greater than the normal burn-up start determination value NBUpm (SBUpm>NBUpm).

When neither of conditions (1) and (2) is satisfied (NO is S128), the ECU 70 performs a PM elimination heating in step S138. The PM elimination heating executed at this time is normal heating, which has been initially set. To be specific, the ECU 70 repeatedly adds fuel from the fuel adding valve 68 so that the air-fuel ratio of the exhaust becomes higher than the stoichiometric air-fuel ratio and the catalyst bed temperature (exhaust temperature thci) increases (e.g., to 600 to 700° C.). This processing causes the particulate matter emission amount PMe to become less than the oxidation amount PMc. Thus, the estimated accumulation amount PMsm decreases gradually (refer to expression 1). Accordingly, the estimated accumulation amount PMsm continues to decrease after time t0 as shown in FIG. 5.

Afterwards, when condition (1) is satisfied (YES in S128), the ECU 70 determines whether this is the timing at which the estimated accumulation amount PMsm is to be increased in step S130. In this embodiment, the timing at which condition (2) is satisfied is set as the timing at which the estimated accumulation amount PMsm is to be increased. Thus, when only condition (1) is satisfied in step S128, the ECU 70 determines step S130 as NO. In step S134, the ECU 70 switches the PM elimination heating to burn-up heating (t1 in FIG. 5), and temporarily terminates this process. In this way, the ECU 70 starts the burn-up heating shown in FIG. 4 as normal burn-up. In the burn-up heating, by performing intermittent addition a predetermined number of times, for example, three times, the PM clogging at the front surface of the NOx storage reduction catalyst 36a is eliminated, and the PM accumulated in the filter 38a is burned up (t1 to t3). In step S134, the estimated accumulation amount PMsm is less than or equal to the normal burn-up start determination value NBUpm, that is, the amount of PM in the NOx storage reduction catalyst 36a and the filter 38a is relatively small. Thus, there would be no problems even if the burn-up heating is performed and PM is burned rapidly.

Figure 6:
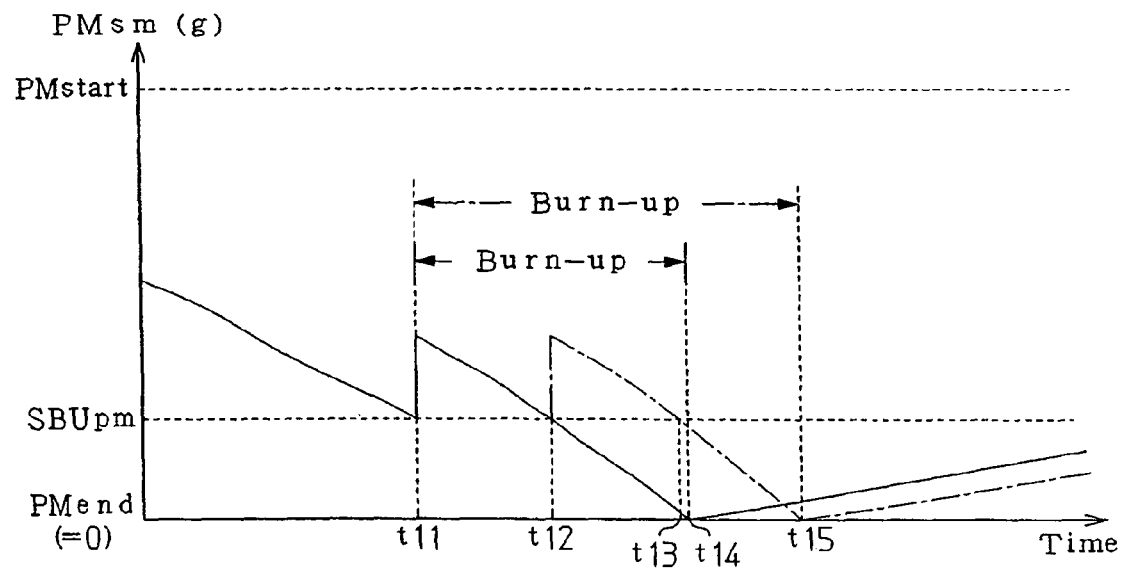

When condition (2) is satisfied in step S128 (YES in S128), the ECU 70 determines whether this is the timing at which the estimated accumulation amount PMsm is to be increased in step S130. The determination in step S128 results in YES. The ECU 70 increases the estimated accumulation amount PMsm in step S132. As a result, the estimated accumulation amount PMsm becomes greater than the special burn-up start determination value SBUpm as shown in FIG. 6. In step S134, the ECU 70 switches the processing to burn-up heating (t11 in FIG. 6). In this manner, burn-up heating is started as special burn-up. The ECU 70 continues burn-up heating until step S122 is determined as NO. The estimated accumulation amount PMsm is less than or equal to the special burn-up start determination value SBUpm, and the amount of PM in the NOx storage reduction catalyst 36a and the filter 38a is relatively small. Thus, there would be no problems even if the burn-up heating is performed and PM is burned rapidly.

When the condition for performing the burn-up heating is satisfied again after the estimated accumulation amount PMsm increases (t12 in FIG. 6), the ECU 70 determines step S130 as YES. Accordingly, the ECU 70 increases the estimated accumulation amount PMsm again in step S132 as indicated by the broken line. The number of times the estimated accumulation amount PMsm increasing process (S132) is executed is limited to twice. Accordingly, even if the burn-up heating perform condition is satisfied for the third time at time t13 in FIG. 6, the ECU 70 determines step S130 as NO.

Once the burn-up heating starts, the ECU 70 continues the burn-up heating (S138) even if the burn-up heating perform condition becomes unsatisfied (NO in S128), that is, even if, for example, The estimated accumulation amount PMsm becomes greater than The special burn-up start determination value SBUpm or the ratio ΔP/GA becomes less than the reference value, which indicates PM clogging.

When burn-up heating is started in this manner, the ECU 70 determines step S124 as YES. In step S126, the ECU 70 determines whether or not the peak value Pthc of the exhaust temperature thci is greater than an inactivation determination temperature Lthc, which indicates the catalyst inactivation level.

Figure 7:
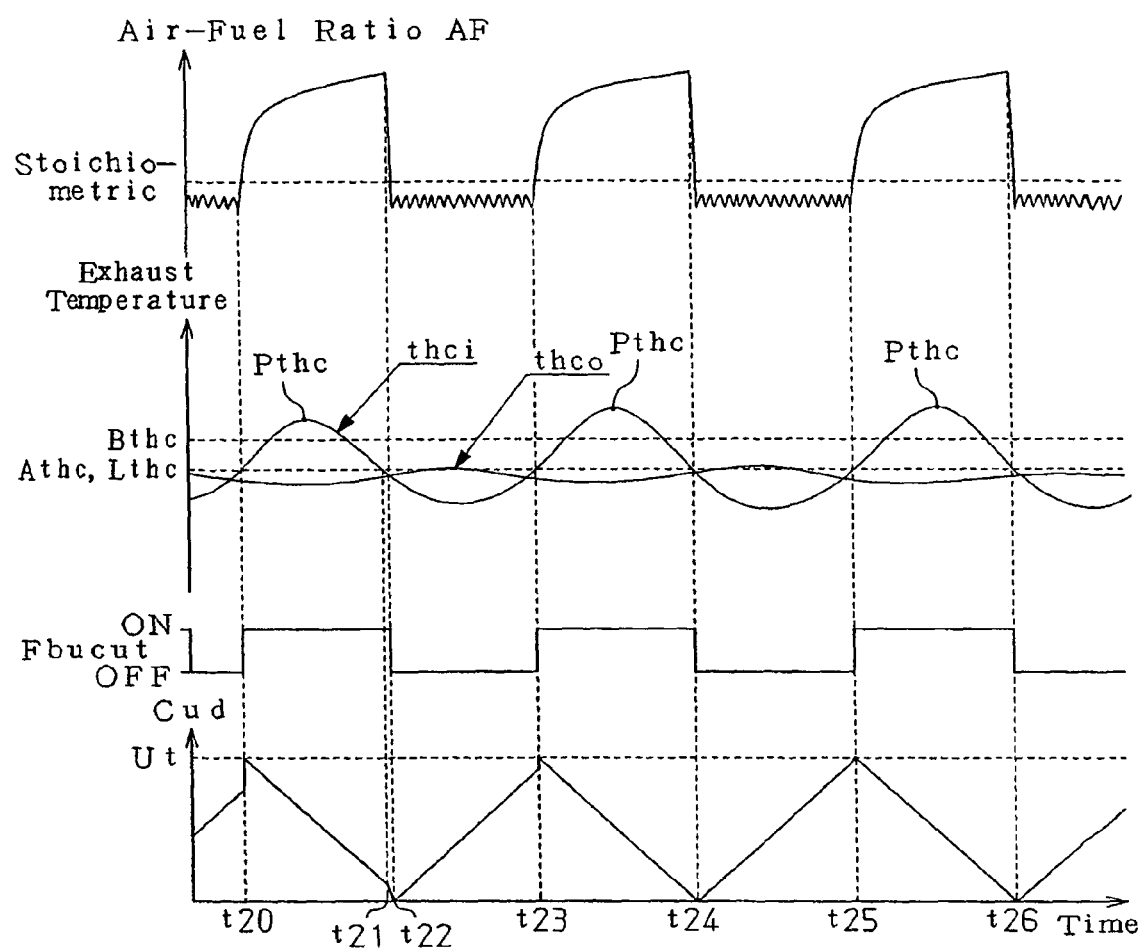

The timing chart of FIG. 7 shows an example in which the NOx storage reduction catalyst 36a is not inactivated. In the example of FIG. 7, the inactivation determination temperature Lthc is set to the same value as a termination determination reference temperature Athc, which will be described later. However, the inactivation determination temperature Lthc does not have to be the same value as the termination determination reference temperature Athc as long as it is a temperature enabling inactivation of the NOx storage reduction catalyst 36a to be determined. When the peak value Pthc is greater than the inactivation determination temperature Lthc as shown in FIG. 7 (YES in S126), the ECU 70 proceeds to step S128. As a result, the ECU 70 continues burn-up heating.

Figure 8:
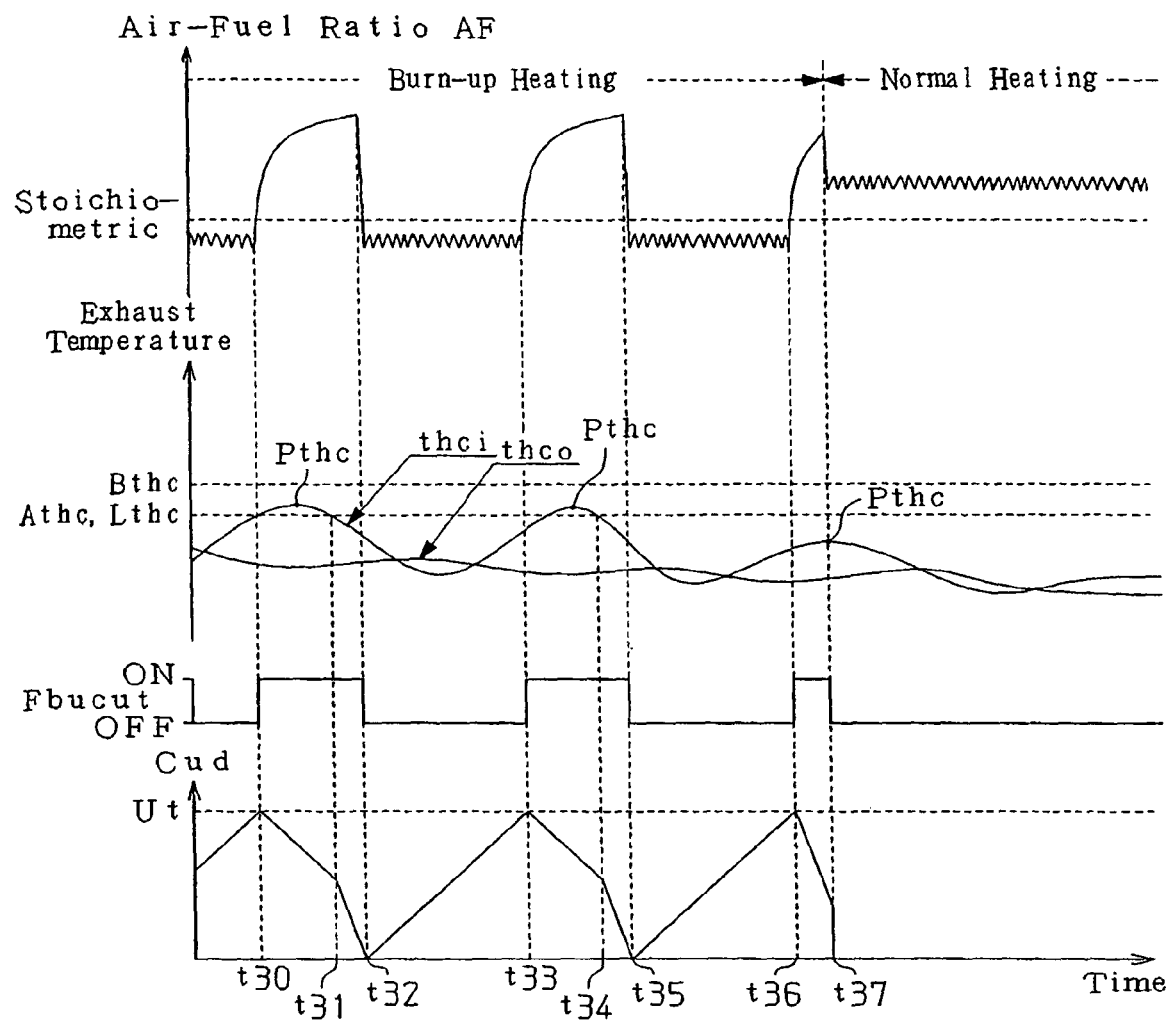

The timing chart of FIG. 8 shows an example in which the NOx storage reduction catalyst 36a is inactivated. In this manner, when the peak value Pthc is less than or equal to the inactivation determination temperature Lthc (NO in S126, t37 in FIG. 8), the ECU 70 sets the burn-up prohibition flag Fx to ON in step S135. This prohibits intermittent addition in burn-up heating. Thus, in step S136, the ECU 70 switches the processing to normal heating.

In the next control cycle, the ECU 70 determines step S124 as NO. Since the burn-up prohibition flag FX is ON (NO in S125), the ECU 70 continues normal heating (S136).

When the burn-up heating or the normal heating results in the estimated accumulation amount PMsm becoming less than or equal to The termination determination value PMend (NO in S122), in step S140, the ECU 70 stops PM elimination heating. Accordingly, the burn-up heating or the normal heating is stopped, and the regeneration mode is terminated (S142). As described above, during normal burn-up, the regeneration mode is terminated after the intermittent addition is performed the predetermined number of times.

The burn-up heating of FIG. 4 will now be described. First, the ECU 70 determines whether an addition prohibition flag Fbucut is OFF in step S152. When the addition prohibition flag Fbucut is OFF, the ECU 70 adds fuel to the exhaust from the fuel adding valve 68 to perform burn-up heating unless the fuel addition is prohibited due to other conditions, such as the driving state of the engine. When the addition prohibition flag Fbucut is ON, the ECU 70 stops fuel addition from the fuel adding valve 68. With the addition prohibition flag Fbucut set ON or OFF, fuel is intermittently added to the exhaust and the burn-up heating is performed.

When the addition prohibition flag Fbucut is OFF (YES in S152), the ECU 70 determines that fuel is presently being added. In this case, in step S154, the ECU 70 increases (e.g., increments) an addition period count value Cud, which is set in the memory of the ECU 70.

In step S156, the ECU 70 determines whether the addition period count value Cud is less than a maximum value Ut. In the initial stage of the control, the addition period count value Cud is less than the maximum value Ut (YES in S156). In step S158, the ECU 70 determines whether the exhaust temperature thci detected by the first exhaust temperature sensor 44 at a location downstream from the NOx storage reduction catalyst 36a is less than the termination determination reference temperature Athc (e.g., 540° C.).

When the exhaust temperature thci is less than the termination determination reference temperature Athc (YES in S158), the ECU 70 determines whether the exhaust temperature thco detected by the second exhaust temperature 46 at a location downstream from the filter 38a is less than a termination determination reference temperature Bthc (e.g., 600° C.) in step S160.

When the exhaust temperature thco is less than the termination determination reference temperature Bthc (YES in S160), the ECU 70 temporarily terminates this process. The addition prohibition flag Fbucut is maintained to be OFF and the fuel addition is continued. This state is a state before time t20 in the timing chart of FIG. 7.

When the exhaust temperature thci becomes greater than or equal to The termination determination reference temperature Athc before The addition period count value Cud becomes greater than or equal to the maximum value Ut (NO in S158, t20 in FIG. 7), the ECU 70 sets the addition period count value Cud to the maximum value Ut in step S162. The ECU 70 sets the addition prohibition flag Fbucut ON in step S164 and temporarily terminates this process. As a result, the fuel addition for burn-up heating is stopped.

In the next control cycle, the addition prohibition flag Fbucut is ON (NO in S152). The ECU 70 decreases (e.g., decrements) the addition period count value Cud in step S166. Then, the ECU 70 determines whether the addition period count value Cud is less than zero in step S168. In the initial stage of the control, the addition period count value Cud is greater than zero (NO in S168). In step S172, the ECU 70 determines whether the exhaust temperature thci is less than the termination determination reference temperature Athc. Immediately after time t20 in FIG. 7, the exhaust temperature thci is greater than or equal to the termination determination reference temperature Athc (NO in S172). In this case, the ECU 70 temporarily terminates this process. Thus, the state in which the fuel addition for burn-up heating is stopped continues.

Referring now to FIG. 7, the exhaust temperature thci increases further after time t20. However, a change in the exhaust temperature thco at the location downstream from the filter 38a is relatively small and the state in which the exhaust temperature thco is less than the termination determination reference temperature Bthc continues.

Afterwards, the exhaust temperature thci decreases and the exhaust temperature thci becomes less than the termination determination reference temperature Athc (YES in S172, t21). The exhaust temperature thco is less than the termination determination reference temperature Bthc (YES in step S174), and the exhaust temperature thci has increased once (YES in S176). In step S178, the ECU 70 determines whether the addition period count value Cud is equal to zero. In the example of FIG. 7, the addition period count value Cud is greater than zero (NO in S178). Thus, the ECU 70 accelerates the decrease of the addition period count value Cud in step S182.

To be specific, when the addition period count value Cud is decremented by one during normal decreasing, the ECU 70 decrements The addition period count value Cud by a value greater than one in a period in which The addition period count value Cud is greater than zero in control cycles after step S182 has been executed.

Thus, in the next and subsequent control cycles, the addition period count value Cud is decreased more rapidly than normal in a period in which The addition period count value Cud is greater than zero as shown in FIG. 7 (t21 to t22).

Afterwards, the processing in steps S166, S168, S170, and S182 is executed so that the addition period count value Cud rapidly reaches zero (t22 in FIG. 7). In this state, the exhaust temperature thci is less than The termination determination reference temperature Athc (YES in S172), the exhaust temperature thco is less than The termination determination reference temperature Bthc (YES in S174), the determination result in step S176 is YES, and The addition period count value Cud is equal to zero (YES in S178). Thus, the ECU 70 sets the addition prohibition flag Fbucut to OFF in step S180. As a result, the ECU 70 starts the fuel addition for burn-up heating.

In the next control cycle, the addition prohibition flag Fbucut is OFF (YES in S152). Thus, the ECU 70 executes the processing in steps S154 to S164. The example of FIG. 7 shows a case in which the exhaust temperature thci becomes greater than or equal to The termination determination reference temperature Athc before The addition period count value Cud becomes greater than or equal to the maximum value Ut (t23). In this case, the ECU 70 sets the addition period count value Cud to the maximum value Ut in step S162, and sets the addition prohibition flag Fbucut ON in step S164. As a result, the fuel addition for burn-up heating is stopped.

In the next control cycle, the addition prohibition flag Fbucut is ON (NO in S152). Thus, the ECU 70 executes the processing in steps S166 to S182. In the example of FIG. 7, the exhaust temperature thci becomes less than the termination determination reference temperature Athc at the same time as when the addition period count value Cud reaches zero (t24). Thus, the ECU 70 sets the addition prohibition flag Fbucut OFF in step S180, and temporarily terminates this process. As a result, the fuel addition for burn-up heating is started.

In the next control cycle, the addition prohibition flag Fbucut is OFF (YES in S152). Thus, the ECU 70 executes the processing in steps S154 to S164. In the example of FIG. 7, the exhaust temperature thci becomes greater than or equal to the termination determination reference temperature Athc at the same time as when the addition period count value Cud reaches the maximum value Ut (t25). Thus, the ECU 70 determines step S156 as NO, sets the addition period count value Cud to the maximum value Ut in step S162, and sets the addition prohibition flag Fbucut ON in step S164. As a result, the fuel addition for burn-up heating is stopped.

In the next control cycle, the addition prohibition flag Fbucut is ON (NO in S152). Thus, the ECU 70 executes the processing in steps S166 to S182. In the example of FIG. 7, the exhaust temperature thci becomes less than the termination determination reference temperature Athc at the same time as when the addition period count value Cud reaches zero (t26). Thus, the ECU 70 sets the addition prohibition flag Fbucut OFF in step S180 and temporarily terminates this process. As a result, the fuel addition for burn-up heating is started. In this way, the ECU 70 intermittently adds fuel to the exhaust in the burn-up heating.

As described above, FIG. 8 shows a state in which the temperature of the exhaust from the diesel engine 2 is low and the NOx storage reduction catalyst 36a is inactivated. Prior to time t37, the peak value Pthc of the exhaust temperature thci is greater than the inactivation determination temperature Lthc. Thus, the ECU 70 performs intermittent addition in burn-up heating. From time t37, the ECU 70 stops burn-up heating and returns the addition prohibition flag FBucut and the addition period count value Cud to their initial states.

The first exhaust temperature sensor 44 corresponds to a temperature detector. Steps S128, S130, S132, and S134 of the regeneration control (FIG. 3) and the burn-up heating (FIG. 4) correspond to the processing performed by a control section. Steps S124, S125, S126, S135, and S136 of the regeneration control (FIG. 3) correspond to the processing performed by a prohibition section. A range less than or equal to the normal burn-up start determination value NBUpm and a range less than or equal to the special burn-up start determination value SBUpm correspond to a burn-up execution range. The NOx storage reduction catalyst 36a corresponds to a first exhaust purification mechanism, and the filter 38a corresponds to a second exhaust purification mechanism.

A regeneration controller according to the first embodiment has the advantages described below.

(1) During regeneration control (FIG. 3), when the peak vale Pthc of the exhaust temperature thci is less than or equal to the inactivation determination temperature Lthc (NO in S126), the ECU 70 determines that the temperature of the NOx storage reduction catalyst 36a has decreased to the catalyst inactivation level. Afterwards, the ECU 70 prohibits burn-up heating (FIG. 4) in steps S135, S136, and S125. Accordingly, during catalyst inactivation, a large amount of fuel is prevented from being released into the exhaust within a short period of time. This prevents inadvertent increase in the accumulation amount of PM.

(2) Burn-up heating is a process for completely burning the PM accumulated in the exhaust purification apparatus, which includes the NOx storage reduction catalyst 36a and the filter 38a. Thus, burn-up heating does not have to always be performed. Accordingly, the burn-up execution range is limited to the range of the estimated accumulation amount PMsm that is less than or equal to the normal burn-up start determination value NBUpm or less than or equal to the special burn-up start determination value SBUpm. That is, burn-up heating is performed only when the estimated accumulation amount is small. Accordingly, under a condition in which the temperature of the exhaust purification apparatus decreases to the catalyst inactivation level and the accumulated amount of PM increases inadvertently until determination of catalyst inactivation, the entire amount of the accumulated PM is minimized.

Further, the NOx storage reduction catalyst 36a and the filter 38a are prevented from being overheated without a large amount of PM being suddenly burned.

(3) When burn-up heating is prohibited, the ECU 70 executes normal heating (S136). Thus, if the filter 38a or part of the NOx storage reduction catalyst 36a is at the activation level temperature, the NOx storage reduction catalyst 36a and the filter 38a are immediately heated and a temperature suitable for PM elimination is restored at an early stage.

In addition, burn-up heating is not performed. Thus, the concentration of the fuel passing through the inactivated portion of the catalyst is low. This prevents inadvertent increase of the PM accumulation amount.

A regeneration controller for an exhaust purification apparatus of an internal combustion engine according to a second embodiment of the present invention will now be described. In the second embodiment, the ECU 70 performs the determination of FIG. 9 in lieu of the determination of step S126. Otherwise, the regeneration controller of the second embodiment is configured in the same manner as the first embodiment.

When determining that intermittent addition is being performed during burn-up heating in step S124, the ECU 70 determines whether the exhaust temperature thci is greater than or equal to the inactivation temperature Lthc in step S202. If the exhaust temperature thci is greater than or equal to the inactivation determination temperature Lthc (YES in S202), the ECU 70 clears a continuous time count value Ct in step S204 and proceeds to step S128 (FIG. 3). Accordingly, the ECU 70 continues intermittent addition during burn-up heating.

The continuous time count value Ct is set to 0 when the regeneration control is started in step S110 of the regeneration mode execution determination process (FIG. 2).

When the exhaust temperature thci is less than the inactivation determination temperature Lthc (NO in S202), the ECU 70 increases the continuous period count value Ct in step S206. In step S208, the ECU 70 determines whether or not the continuous period count value Ct is less than a prohibition determination reference time Cx. When the continuous time count value Ct is less than the prohibition determination reference time Cx (YES in S208), the ECU 70 proceeds to step S128 (FIG. 3). Accordingly, the ECU 70 continues intermittent addition during burn-up heating.

When the continuous time count value CT continues to increase in step S206 without being cleared in step S204, the continuous period count value Ct gradually increases. When the continuous time count value Ct becomes greater than or equal to the prohibition determination reference time Cx (NO in S208), the ECU 70 proceeds to step S135 (FIG. 3). This prohibits intermittent addition during burn-up heating. Thus, the ECU 70 switches to normal heating.

Figure 10:
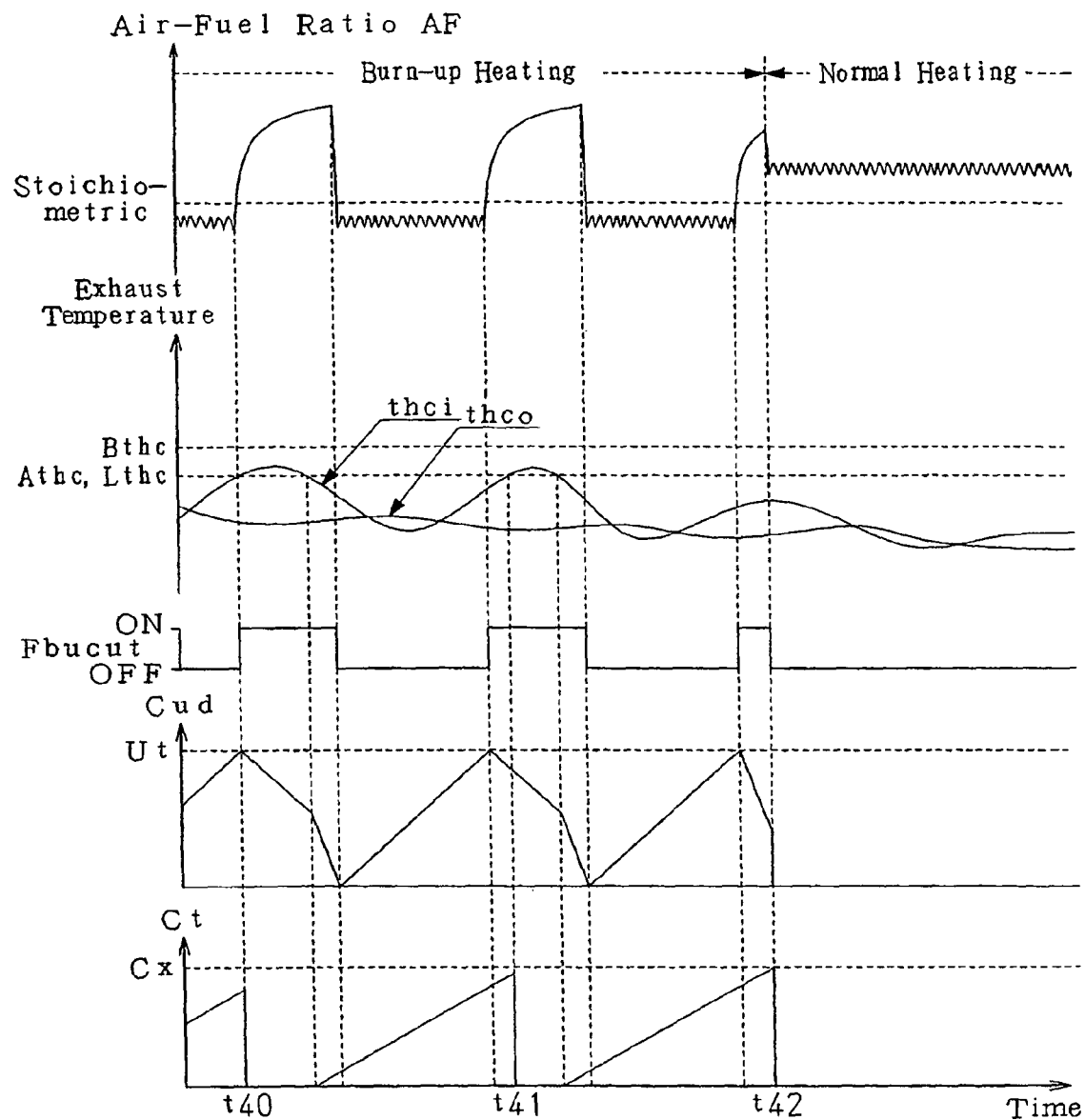
FIG. 10 is a timing chart for regeneration control in the second embodiment.

FIG. 10 shows a control example for the second embodiment. At times t40 and t41, the exhaust temperature thci is greater than or equal to The inactivation determination temperature Lthc in a state in which the continuous time count value Ct is less than The prohibition determination reference time Cx (YES in S202). Accordingly, the ECU 70 continues intermittent addition during burn-up heating. At time t42, the continuous time count value Ct is greater than or equal to the prohibition determination reference time Cx (NO in S208). Thus, intermittent addition is prohibited during burn-up heating, and the ECU 70 switches processing to normal heating.

Steps S124, S125, S202 to S208, S135, and S136 correspond to the processing performed by a prohibition section.

In the regeneration controller of the second embodiment, the ECU 70 compares the exhaust temperature thci with the inactivation determination temperature Lthc and determines the continuous time during which the exhaust temperature thci was less than the inactivation determination temperature Lthc. Based on the determination result, the same processing as in the first embodiment is performed. Accordingly, the regeneration controller of the second embodiment has the same advantages as that of the first embodiment.

Figure 11:
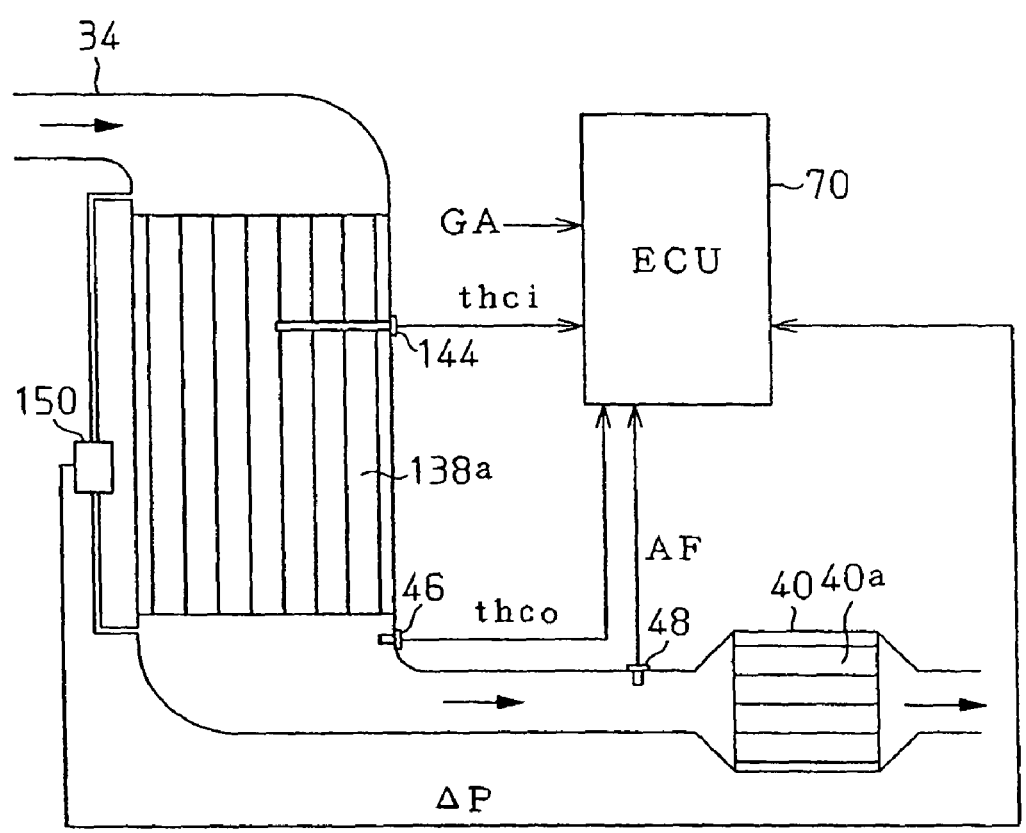
FIG. 11 is a schematic diagram showing an exhaust purification apparatus according to a third embodiment of the present invention.

A regeneration controller for an exhaust purification apparatus of an internal combustion engine according to a third embodiment of the present invention will now be discussed. In the third embodiment, the exhaust purification apparatus shown in FIG. 11 is used in lieu of the two catalytic converters, that is, the first and second catalytic converters, shown in FIG. 1.

The exhaust purification apparatus includes a filter 138a having a base and a NOx storage catalyst converter layer coated on the base. A pressure difference sensor 150 detects the pressure difference ΔP between the upstream and downstream sides of the filter 138a. The first exhaust temperature sensor 144, which functions as a temperature detector, detects the exhaust temperature thci in the filter 138a. A second exhaust temperature sensor 46, an air-fuel ratio sensor 48, a third catalytic converter 40, and an oxidation catalyst 40a are identical to those components denoted with the same reference numbers in the first embodiment. The other parts are the same as the first or second embodiment.

Figure 9:
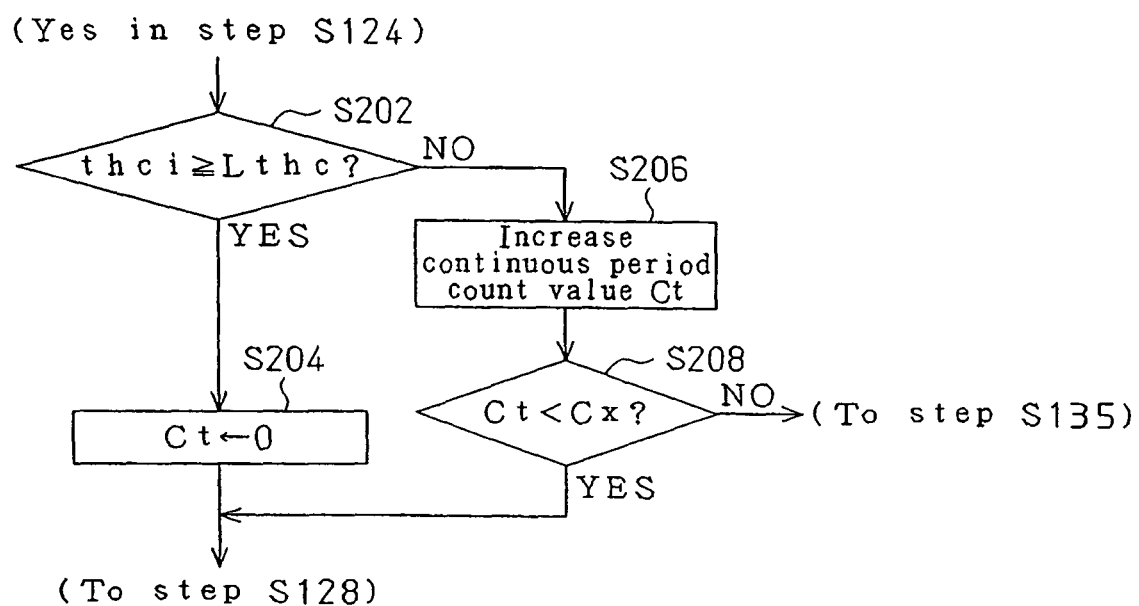
FIG. 9 is a flowchart showing part of the regeneration control according to a second embodiment of the present invention.

The ECU 70 of the third embodiment performs the regeneration mode execution determination (FIG. 2), the regeneration control (FIG. 3), and the burn-up heating (FIG. 4) of the first or second embodiments or the processing of FIG. 9. Thus, the ECU 70 of the third embodiment functions in the same manner as that of the first or second embodiments.

The regeneration controller of the third embodiment uses the exhaust temperature thci for the determinations in step S126 of FIG. 3 or step S202 of FIG. 9 and has the same advantages as the first or second embodiments.

The ECU 70 determines the catalyst inactivation level based on the exhaust temperature thci at an intermediate portion of the filter 138a. Accordingly, the ECU 70 determines whether the temperature of the filter 138a is low at an early stage and prevents inadvertent increase in the PM accumulation amount.

It should be apparent to those skilled in the art that the present invention may be embodied in many other specific forms without departing from the spirit or scope of the invention. Particularly, it should be understood that the present invention may be embodied in the following forms.

In each of the above embodiments, the ECU 70 adjusts the air-fuel ratio by adding fuel to the exhaust with the adding valve 68 (continuous addition during normal heating and intermittent addition during burn-up heating). Instead of the fuel addition or in addition to the fuel addition, after injection may be performed with the fuel injection valve 58 to adjust the air-fuel ratio.

In each of the above embodiments, the special burn-up start determination value SBUpm is greater than the normal burn-up start determination value NBUpm. However, The special burn-up start determination value SBUpm may be equal to the normal burn-up start determination value NBUpm or be less than the normal burn-up start determination value NBUpm.

In each of the above embodiments, the normal burn-up start determination value NBUpm and the special burn-up start determination value SBUpm are greater than the termination determination value PMend. Instead, either one or both of the normal burn-up start determination value NBUpm and the special burn-up start determination value SBUpm may be equal to the termination determination value PMend.

In each of the above embodiments, during burn-up heating, the ECU 70 intermittently decreases the exhaust air-fuel ratio by repeating fuel addition to the exhaust system and suspension of fuel addition. Instead, during burn-up heating, the ECU 70 may intermittently decrease the air-fuel ratio by repeating high-concentration fuel addition (or after injection) and low-concentration fuel addition (or after injection).

In each of the above embodiments, instead of the exhaust temperature thci, the ECU 70 may use the exhaust temperature thco of a position downstream from the filter 38a or 138a that is detected by the second exhaust temperature sensor 46 for the determinations of step S126 in FIG. 3 or step S202 in FIG. 9. Further, the ECU 70 may use both of the exhaust temperatures thci and thco for the above determinations.

In the first embodiment, the inactivation determination temperature Lthc is equal to the termination determination reference temperature Athc. In step S126 of FIG. 3, the ECU 70 compares the peak value Pthc of the exhaust temperature thci with the inactivation determination temperature Lthc. Instead, the inactivation determination temperature Lthc may be set at a temperature that is significantly lower than the termination determination reference temperature Athc, and the ECU 70 may determine inactivation by comparing the exhaust temperature thci with the inactivation determination temperature Lthc in step S126.

In the first embodiment, once the peak value Pthc is determined as being less than or equal to the inactivation determination temperature Lthc (FIG. 3, NO in S126), the ECU 70 immediately prohibits burn-up heating. Instead, the ECU 70 may prohibit burn-up heating when the peak value Pthc is successively determined two or more times as being less than or equal to the inactivation determination temperature Lthc.

In each of the above embodiments, when burn-up heating is being prohibited, the prohibition is continued during the same regeneration control and stopped when the next regeneration control is started. Instead, the ECU 70 may allow burn-up heating when determining that normal heating has sufficiently raised the exhaust temperature thci and thereby eliminated the inactivation state.

The present examples and embodiments are to be considered as illustrative and not restrictive, and the invention is not to be limited to the details given herein, but may be modified within the scope and equivalence of the appended claims.

The invention claimed is:

1. A regeneration controller for eliminating particulate matter accumulated in an exhaust purification apparatus in an exhaust system of an internal combustion engine, in which exhaust having an air-fuel ratio passes through the exhaust system during engine operation, wherein the exhaust apparatus includes catalyst, the regeneration controller comprising:
    a heating section for heating the exhaust purification apparatus and eliminating the particulate matter accumulated in the exhaust purification apparatus when an estimated accumulation amount is greater than a reference accumulation amount, the heating section obtaining the estimated accumulation amount by estimating the amount of particulate matter accumulated in the exhaust purification apparatus;
    a temperature detector for detecting temperature of the exhaust purification apparatus;
    a control section for repeatedly changing the air-fuel ratio of the exhaust between a rich state and a lean state to perform burn-up heating of the exhaust purification apparatus for burning the particulate matter accumulated in the exhaust purification apparatus and for continuously lowering the air-fuel ratio of the exhaust to perform normal heating of the exhaust purification apparatus, wherein the control section performs burn-up heating when the estimated accumulation amount is less than or equal to a burn-up start determination value and performs normal heating when the estimated accumulation amount is greater than the reference accumulation amount and the burn-up start determination value, and wherein the control section switches the heating of the exhaust purification apparatus from the normal heating to the burn-up heating when the estimated accumulation amount obtained in a period in which heating of the exhaust purification apparatus is being performed becomes less than or equal to the burn-up start determination value; and
    a prohibition section for prohibiting burn-up heating when the temperature detected by the temperature detector decreases to a catalyst inactivation level.

2. The regeneration controller according to claim 1, wherein the heating section performs normal heating when the prohibition section prohibits burn-up heating.

3. The regeneration controller according to claim 1, wherein:
    the exhaust purification apparatus includes a first exhaust purification mechanism arranged in the exhaust system and a second exhaust purification apparatus arranged downstream from the first exhaust purification apparatus; and
    the temperature detector detects as the temperature of the exhaust purification apparatus at least one of the exhaust temperature between the first and second exhaust purification mechanisms and the exhaust temperature at a downstream side of the second exhaust purification mechanism.

4. The regeneration controller according to claim 1, wherein the temperature detector detects as the temperature of the exhaust purification apparatus at least one of the temperature at an intermediate portion of the exhaust purification apparatus and the exhaust temperature at a downstream side of the exhaust purification apparatus.

5. The regeneration controller according to claim 1, wherein when the temperature detected by the temperature detector decreases to a catalyst inactivation level while the normal heating is being performed, the prohibition section does not prohibit heating of the exhaust purification apparatus.

6. A regeneration controller for eliminating particulate matter accumulated in an exhaust purification apparatus in an exhaust system of an internal combustion engine, in which exhaust having an air-fuel ratio passes through the exhaust system during engine operation, wherein the exhaust apparatus includes catalyst, the regeneration controller comprising:
    a heating section for heating the exhaust purification apparatus and eliminating the particulate matter accumulated in the exhaust purification apparatus when an estimated accumulation amount is greater than a reference accumulation amount, the heating section obtaining the estimated accumulation amount by estimating the amount of particulate matter accumulated in the exhaust purification apparatus;
    a temperature detector for detecting temperature of the exhaust purification apparatus;
    a control section for repeatedly changing the air-fuel ratio of the exhaust between a rich state and a lean state to perform burn-up heating of the exhaust purification apparatus for burning the particulate matter accumulated in the exhaust purification apparatus and for continuously lowering the air-fuel ratio of the exhaust to perform normal heating of the exhaust purification apparatus, wherein the control section performs burn-up heating when the estimated accumulation amount is less than or equal to a burn-up start determination value and performs normal heating when the estimated accumulation amount is greater than the reference accumulation amount and the burn-up start determination value; and
    a prohibition section for prohibiting burn-up heating when the period during which the temperature detected by the temperature detector is lower than a catalyst inactivation level is longer than a prohibition determination reference period.

7. The regeneration controller according to claim 6, wherein the heating section performs normal heating when the prohibition section prohibits burn-up heating.

8. The regeneration controller according to claim 6, wherein:
the exhaust purification apparatus includes a first exhaust purification mechanism arranged in the exhaust system and a second exhaust purification apparatus arranged downstream from the first exhaust purification apparatus; and
the temperature detector detects as the temperature of the exhaust purification apparatus at least one of the exhaust temperature between the first and second exhaust purification mechanisms and the exhaust temperature at a downstream side of the second exhaust purification mechanism.

9. The regeneration controller according to claim 6, wherein the temperature detector detects as the temperature of the exhaust purification apparatus at least one of the temperature at an intermediate portion of the exhaust purification apparatus and the exhaust temperature at a downstream side of the exhaust purification apparatus.

10. A method for eliminating particulate matter accumulated in an exhaust purification apparatus in an exhaust system of an internal combustion engine, in which exhaust having an air-fuel ratio passes through the exhaust system during engine operation, the method comprising:
estimating the amount of particulate matter accumulated in the exhaust purification apparatus to obtain an estimated accumulation amount;
performing burn-up heating of the exhaust purification apparatus by repeatedly changing the air-fuel ratio of the exhaust between a rich state and a lean state to burn the particulate matter accumulated in the exhaust purification apparatus, when the estimated accumulation amount is less than or equal to a burn-up start determination value;
performing normal heating of the exhaust purification apparatus by continuously lowering the air-fuel ratio of the exhaust, when the estimated accumulation amount is greater than the reference accumulation amount and the burn-up start determination value;
switching the heating of the exhaust purification apparatus from the normal heating to the burn-up heating when the estimated accumulation amount obtained in a period in which heating of the exhaust purification apparatus is being performed becomes less than or equal to the burn-up start determination value;
detecting temperature of the exhaust purification apparatus; and
prohibiting burn-up heating when the detected temperature decreases to a catalyst inactivation level.

11. The method according to claim 10, wherein said prohibiting burn-up heating includes prohibiting burn-up heating when the detected temperature is less than or equal to a predetermined temperature.

12. The method according to claim 10, wherein said prohibiting burn-up heating includes prohibiting burn-up heating based on a period during which the detected temperature is less than or equal to a predetermined temperature.

13. The method according to claim 10, wherein said detecting temperature of the exhaust purification apparatus includes detecting temperature of the exhaust flowing through the exhaust purification apparatus.

14. The method according to claim 10, wherein when the detected temperature decreases to a catalyst inactivation level while the normal heating is being performed, prohibition of heating the exhaust purification apparatus is not performed.

* * * * *